3,178,295
PHOTOGRAPHIC SILVER HALIDE EMULSIONS FOG STABILIZED WITH COPOLYMERS OF N,N-DI-NORMAL - BUTYLACRYLAMIDE AND ACRYLIC ACID

Louis M. Minsk and David P. Brust, Rochester, N.Y., assignors to Eastman Kodak Company, Rochester, N.Y., a corporation of New Jersey
No Drawing. Filed July 27, 1961, Ser. No. 127,094
3 Claims. (Cl. 96—114)

This invention relates to stabilized photographic compositions, and more particularly, to photographic silver halide emulsions containing novel fog-inhibiting agents.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is an object of this invention to provide a new method for stabilizing photographic emulsions.

It is another object of this invention to inhibit fog formation in photographic silver halide emulsions with novel addenda.

It is still another object of this invention to provide novel polymeric antifoggants for photographic gelatino-silver-halide emulsions.

These and other objects of the invention are attained by photographic gelatino-silver halide emulsions containing a copolymer of N,N-di-normal-butylacrylamide and acrylic acid.

The subject copolymers can be readily prepared in accordance with known methods. More specifically, N,N-di-normal-butylacrylamide and acrylic acid are added as monomers to the polymerization reaction vessel in a polymerization solvent, such as dioxane, ethanol or the like, the reactants suitably being proportioned so that the resulting copolymer comprises about 15 to 50 percent of the acrylic acid moiety. A peroxide catalyst, such as benzoyl peroxide in conventional catalytic amounts is utilized to effect the polymerization. Elevated temperatures (e.g., 90° C.) are utilized to facilitate the polymerization in accordance with usual practice. The inherent viscosity is 2.303 times $\log_{10}$ of the relative viscosity divided by the concentration and the relative viscosity is determined by dividing the flow time of the solution by the flow time of the solvent using a concentration of 0.250 g. of the compound diluted to 100 ml. with ethanol. Suitable polymeric emulsion addenda of the invention are prepared to have an inherent viscosity of 25° C. in ethanol of about .1 to .6. The copolymer addenda used in the emulsions of the invention are hydrophilic and soluble in water at pH's above about 6.

The addenda of the invention can be added to photographic silver halide emulsions for the purpose of increasing the stability thereof. The subject addenda serve as antifoggants in photographic silver halide emulsions. This antifoggant property of the subject copolymers of N,N-di-normal-butylacrylamide and acrylic acid was quite unexpected as other copolymers of different N-substituted acrylamides do not exhibit such properties. Also the closely related copolymer of acrylamide and acrylic acid was found not to exhibit antifoggant properties.

The preparation of photographic silver halide emulsions, such as are suitably stabilized with the addenda of the invention typically involves three separate operations: (1) emulsification and digestion of silver halide, (2) the freeing of the emulsion of excess water-soluble salts, suitably by washing with water, and (3) the second digestion or "after-ripening" to obtain increased emulsion speed or sensitivity (Mees, "The Theory of the Photographic Process," 1954). The stabilizers of our invention can be added to the emulsion before the final digestion or after-ripening, or they can be added immediately prior to the coating.

The particular quantity of the present stabilizers used in a given emulsion can vary, depending upon the effects desired, degree of ripening, silver content of the emulsion, etc. We have found that generally from about 5 to 40 percent by weight based on the gelatin in the silver halide emulsion of the subject polymeric addenda is quite adequate to accomplish the desired stabilization. Exposure of the treated emulsion in conventional photographic testing apparatus, such as an intensity scale sensitometer, will reveal the most advantageous concentrations for the present stabilizers in that particular emulsion. Such techniques are well understood by those skilled in the art.

The addenda of the invention can be added to photographic emulsions using any of the well-known techniques in emulsion making. For example, they can be dissolved in a suitable solvent and added to the silver halide emulsion, or they can be added to the emulsion in the form of a dispersion similar to the technique used to incorporate certain types of color-forming compounds (couplers) in a photographic emulsion. Techniques of this type are described in Jelley et al. U.S. Patent 2,322,027, issued June 15, 1943, and Fierke et al. U.S. Patent 2,801,171, issued July 30, 1957. The solvent should be selected so that it has no harmful effect upon the emulsion in accordance with usual practice, and generally solvents or diluents which are miscible with water are to be preferred. Water alone is a suitable dispersing medium for the stabilizers of the invention. In other cases, the subject stabilizers can be dissolved in solvents, such as ethanol, acetone, pyridine, N,N-dimethylformamide, etc., and added to the emulsion in this form.

The emulsions of the invention can be chemically sensitized by any of the other well-known procedures. The emulsions can be digested with naturally active gelatin, or sulfur compounds can be added, such as those described in Sheppard U.S. Patent 1,574,944, issued March 2, 1926, and Sheppard et al. 1,623,499, issued April 5, 1927, and Sheppard and Brigham U.S. Patent 2,410,689, issued November 5, 1946. The emulsions can also be treated with salts of the noble metals, such as ruthenium, rhodium, palladium, iridium and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948. The emulsions can also contain sensitizing amounts of gold salts as described in Waller et al. U.S. Patent 2,399,083, issued April 23, 1946. Suitable compounds are potassium chloroaurite, potassium aurithiocyanate, potassium chloroaurate, auric trichloride and 2-aurosulfonbenzothiazole methochloride. The emulsions can also contain sensitizing amounts of reducing agents, such as stannous salts (Carroll U.S. Patent 2,487,850, issued November 15, 1949), polyamines, such as diethylene triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl)sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950; and 2,739,964, issued March 27, 1956; Brooker and Keyes U.S. Patent 2,493,748, issued January 10, 1950; Sprague U.S. Patents 2,503,776, issued April 11, 1950 and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions can contain a suitable gelatin plasticizer such as glycerin; a dihydroxy alkane such as 1,5-pentane diol as described in Milton and Murray U.S. Patent 2,960,404, issued November 15, 1960; an ester of an ethylene bis-glycolic acid such as ethylene bis(methyl glycolate) as described in Milton U.S. Patent 2,904,434, issued September 15, 1959; bis(ethoxy diethylene glycol) succinate as described in Gray U.S. Patent 2,940,854, issued June 14, 1960. The plasticizer can be added to the emulsion before or after the addition of a sensitizing dye, if used.

The emulsion can be hardened with any suitable hardener for gelatin such as formaldehyde; a halogen-substituted aliphatic acid such as mucobromic acid as described in White U.S. Patent 2,080,019, issued May 11, 1937; a compound having a plurality of acid anhydride groups such as 7,8-diphenylbicyclo(2,2,2)-7-octene-2,3,5,6-tetracarboxylic dianhydride, or a dicarboxylic or a disulfonic acid chloride such as terephthaloyl chloride or naphthalene-1,5-disulfonyl chloride as described in Allen and Carroll U.S. Patents 2,725,294 and 2,725,295, both issued November 29, 1955; a cyclic 1,2-diketone such as cyclopentane-1,2-dione as described in Allen and Byers U.S. Patent 2,725,305, issued November 29, 1955; a bisester of methane-sulfonic acid such as 1,2-di-(methane-sulfonoxy)ethane as described in Allen and Laakso U.S. Patent 2,726,162, issued December 6, 1955; 1,3-dihydroxymethylbenzimidazol-2-one as described in July, Knott and Pollak U.S. Patent 2,732,316, issued January 24, 1956; a dialdehyde or a sodium bisulfite derivative thereof, the aldehyde groups of which are separated by 2-3 carbon atoms, such as $\beta$-methylglutaraldehyde bis-sodium bisulfite; a bisaziridine carboxamide such as trimethylene bis(1-aziridine carboxamide) as described in Allen and Webster U.S. Patent 2,950,197, issued August 23, 1960; or 2,3-dihydroxy dioxane as described in Jeffreys U.S. Patent 2,870,013, issued January 20, 1959.

The emulsion can contain a coating aid such as saponin; a lauryl or oleoyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)glutamate, or a sulfosuccinamate such as tetrasodium N,N-(1,2-dicarboxyethyl)-N-octadecyl sulfosuccinamate, or N-lauryl disodium sulfosuccinamate.

The stabilizer addenda of the invention can be used in various kinds of photographic emulsions. In addition to being useful in orthochromatic, panchromatic, and infrared sensitive emulsions, they are also useful in X-ray and other non-optically sensitized emulsions. They can be added to the emulsion before or after any optical sensitizing dyes which may be used. Various silver salts can be used as the sensitive salt such as silver bromide, silver iodide, silver chloride, or mixed silver halides such as silver chlorobromide or silver bromoiodide. The subject addenda can be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955, or emulsions of the mixed-grain type, such as described in Carroll and Hanson U.S. Patent 2,592,243, issued April 8, 1952. The subject stabilizers can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

The subject addenda can also be used in emulsions intended for use in diffusion transfer processes which utilize the undeveloped silver halide in the non-image areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,608,236, issued December 28, 1954 and 2,543,181, issued February 27, 1951. They can also be used in color transfer processes which utilize the diffusion transfer of an imagewise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; and Yutzy U.S. Patent 2,756,142, issued July 24, 1956.

The above-described emulsions of the invention can be coated on a wide variety of supports in accordance with usual practice. Typical supports for photographic elements of the invention include cellulose nitrate film, cellulose acetate film, polyvinyl acetal film polystyrene film, polyethyleneterephthalate film and related films of resinous materials, as well as glass, paper, metals and others.

The invention is further illustrated by the following examples of preferred embodiments thereof.

EXAMPLE 1

*Preparation of a copolymer photographic addenda of the invention*

To a three-liter, round-bottomed flask containing 684 ml. of p-dioxane was added 171.0 g. of N,N-di-normal-butylacrylamide, 56.4 g. of acrylic acid (boiling 40–41° C. at 9 mm.) and 2.274 g. of benzoyl peroxide catalyst. The N,N-di-normal-butylacrylamide was prepared by the method described by C. Moureu in Ann. Chim. (7), 2, 178 (1894). After the peroxide catalyst had dissolved, the reaction flask, fitted with a reflux condenser, was placed in a 90° C. water bath for 2.25 hours. The reaction flask was then allowed to stand overnight (ca. 18 hours) at room temperature (ca. 25° C.). The resulting reaction mixture was then poured into 15 liters of petroleum ether (boiling 35–60° C.) with stirring and the resulting white precipitate was then filtered through a Buchner funnel and rinsed with more petroleum ether. The filtered product was similarly washed five more times with six liter portions of petroleum ether, and then dried under a water pump vacuum at 40° C. overnight. The resulting polymeric product weighed 204 g., had an intrinsic viscosity at 25° C. in ethanol of 0.22, a 6.0% by weight nitrogen content and a 23.8 percent by weight acrylic acid moiety content.

EXAMPLE 2

The copolymer of the invention described in Example 1 above was tested as an antifoggant in a high-speed, coarse-grained gelatino-silver bromoiodide (ca. 95% bromide) emulsion of the type commonly used in medical X-ray films. About 178 g. of gelatin per mole of silver halide was utilized in the emulsion. The emulsion was then coated on a cellulose acetate film support at a coverage of 562 mg. of silved per square foot and exposed in the form of film strips in an Eastman Ib sensitometer at 1/25 second intervals, developed for 3 minutes at 68° F. and then fixed, washed and dried in the usual manner. Samples of the coated emulsion were tested both initially and after a two-week incubation period at 120° F. and at a relative humidity of 50 percent. Test samples containing no copolymer antifoggant addenda were included for purposes of comparison. The developer utilized had essentially the following formula:

|  | G. |
|---|---|
| N-methyl-p-aminophenol sulfate | 2.2 |
| Sodium sulfite (anhydrous) | 72.0 |
| Hydroquinone | 8.8 |
| Sodium carbonate | 130.0 |
| Potassium bromide | 4.0 |

Water to make 1 liter.

The results of the sensitometric tests are summarized by the data set out in Table A below wherein the speeds indicated are a function of the exposure necessary to give a density of 0.3 above background fog and expressed as a reciprocal relation to exposure, the initial control speed being taken as 100.

TABLE A

| Addenda | Fresh Test | | | 120° F., 50% R.H., 2 Weeks | | |
|---|---|---|---|---|---|---|
|  | Speed | γ | Fog | Speed | γ | Fog |
| Control (no copolymer) | 100 | 2.80 | .08 | 115 | 2.50 | .21 |
| 43 g. copolymer per mole silver halide | 94 | 3.00 | .08 | 107 | 2.75 | .08 |

As can be observed from the data set out in Table A, the subject copolymer substantially retarded fog formation of the test emulsion subjected to the incubation.

EXAMPLE 3

Using the general procedure described in Example 1, several copolymers of the invention were prepared with varying levels of acrylic acid as summarized by the data set out in Table B below wherein the proportions of reactants and analysis of the copolymer products are included.

TABLE B

|  | Copolymer | | |
|---|---|---|---|
|  | I | II | III |
| Grams of N,N-di-normalbutylacrylamide | 108.9 | 90.6 | 81.5 |
| Grams of acrylic acid | 29.2 | 36.3 | 38.8 |
| Grams of benzoyl peroxide catalyst | 1.381 | 1.269 | 1.203 |
| Ml. of p-dioxane solvent | 414.3 | 380.7 | 360.9 |
| Yield of copolymer in grams | 121 | 117 | 113.1 |
| Inherent viscosity of copolymer [1] | 0.18 | 0.20 | 0.23 |
| Percent combined acrylic acid in copolymer | 20.3 | 27.3 | 30.7 |
| Percent nitrogen in copolymer | 5.9 | 5.6 | 5.0 |

[1] 25° C. in ethanol.

The above-described three copolymers of the invention were incorporated into the emulsion described in Example 2 and tested as described in Example 2 except that the incubation period was one week instead of two weeks at 120° F. and 50 percent relative humidity. The sensitometric data for the sample emulsions are summarized in Table C below. The copolymers were added at a level of 43 grams of copolymer per mole of silver halide in the emulsion.

TABLE C

| Addenda | Fresh Test | | | 120° F., 50% R.H., 1 week | | |
|---|---|---|---|---|---|---|
|  | Speed | γ | Fog | Speed | γ | Fog |
| Control (no copolymer) | 100 | 1.69 | 0.10 | 123 | 1.56 | 0.17 |
| Copolymer I | 87 | 1.41 | 0.15 | 95 | 1.34 | 0.14 |
| Copolymer II | 100 | 1.59 | 0.07 | 107 | 1.55 | 0.08 |
| Copolymer III | 95 | 1.63 | 0.07 | 105 | 1.61 | 0.08 |

The data in Table C further demonstrates the properties of the subject copolymers to retard incubation fog in photographic gelatino-silver-halide emulsions.

EXAMPLE 4

For purposes of comparison, a copolymer of acrylamide and acrylic acid was prepared by the general method described in Example 1 and tested by the general method described in Example 2. This prepared copolymer was found not to function as an antifoggant addenda in the silver halide emulsion. The prepared copolymer of acrylamide and acrylic acid was utilized in the emulsion at a concentration of 43 grams of copolymer per mole of silver halide as in Example 2. The sensitometric data is summarized in Table D below.

TABLE D

| Addenda | Initial Test | | | 120° F., 50% R.H., 2 Weeks | | |
|---|---|---|---|---|---|---|
|  | Speed | γ | Fog | Speed | γ | Fog |
| Control (no copolymer) | 100 | 1.70 | .06 | 105 | 1.52 | .07 |
| 43 g. of copolymer of acrylamide and acrylic acid per mole of silver halide | 126 | 1.67 | .10 | 112 | 1.45 | .10 |

The data in Table D points up the unobviousness of the present invention, the copolymer of acrylamide and acrylic acid being very closely related to the copolymer of N,N-di-normal-butylacrylamide and acrylic acid of the invention.

The present invention thus provides new and useful antifoggant addenda for photographic gelatino-silver halide emulsions.

The invention has been described in detail with particular reference to preferred embodiments thereof, but it will be understood that variations and modifications can be effected within the spirit and scope of the invention as described hereinabove and as defined in the appended claims.

We claim:

1. A photographic gelatino-silver halide emulsion containing about 5 to 40 percent by weight based on the said gelatin in said emulsion of a polymeric hydrophilic composition consisting essentially of a copolymer of N,N-di-normal-butylacrylamide and acrylic acid wherein the acrylic acid comprises about 15 to 50 percent by weight of said copolymer.

2. A Photographic gelatino-silver halide emulsion containing about 5 to 40 percent by weight based on the said gelatin in said emulsion of a polymeric hydrophilic composition having an inherent viscosity at 25° C. in ethanol of about .1 to .6 and consisting essentially of a copolymer of N,N-di-normal-butylacrylamide and acrylic acid wherein the acrylic acid comprises about 15 to 50 percent by weight of said copolymer.

3. A photographic support having coated thereon an emulsion as described in claim 1.

References Cited by the Examiner
UNITED STATES PATENTS

| | | | |
|---|---|---|---|
| 2,461,023 | 2/49 | Barnes et al. | 96—114 |
| 2,632,704 | 3/53 | Lowe et al. | 96—114 |
| 2,811,494 | 10/57 | Smith et al. | 96—114 |
| 2,835,582 | 5/58 | Fowler et al. | 96—114 |

NORMAN G. TORCHIN, *Primary Examiner.*